United States Patent
Spanke

(10) Patent No.: US 6,734,819 B2
(45) Date of Patent: May 11, 2004

(54) LEVEL MEASURING DEVICE OPERATING WITH MICROWAVES

(75) Inventor: Dietmar Spanke, Loerrach (DE)

(73) Assignee: Endress + Hauser GmbH + Co. (DE)

( * ) Notice: Subject to any disclaimer, the term of this patent is extended or adjusted under 35 U.S.C. 154(b) by 0 days.

(21) Appl. No.: 10/067,312

(22) Filed: Feb. 7, 2002

(65) Prior Publication Data

US 2002/0109626 A1 Aug. 15, 2002

Related U.S. Application Data

(60) Provisional application No. 60/268,861, filed on Feb. 16, 2001.

(30) Foreign Application Priority Data

Feb. 14, 2001 (EP) .............................. 01103402

(51) Int. Cl.[7] .......................... G01S 13/08; G01F 23/00
(52) U.S. Cl. ...................... 342/124; 342/190; 73/290 R
(58) Field of Search ................................ 342/124, 190; 73/290 V, 290 R; 367/908

(56) References Cited

U.S. PATENT DOCUMENTS

| | | | | |
|---|---|---|---|---|
| 5,365,178 A | * | 11/1994 | Van Der Pol | 324/644 |
| 5,440,310 A | * | 8/1995 | Schreiner | 342/124 |
| 5,609,059 A | * | 3/1997 | McEwan | 73/290 R |
| 5,614,911 A | | 3/1997 | Otto et al. | |
| 5,689,265 A | * | 11/1997 | Otto et al. | 342/124 |
| 5,719,580 A | | 2/1998 | Core | |
| 5,734,346 A | * | 3/1998 | Richardson et al. | 342/124 |
| 5,799,534 A | * | 9/1998 | van der Pol | 73/290 V |
| 6,169,706 B1 | * | 1/2001 | Woodward et al. | 367/99 |
| 6,249,244 B1 | * | 6/2001 | Heidecke | 342/124 |
| 6,320,532 B1 | * | 11/2001 | Diede | 342/124 |
| 6,414,625 B1 | * | 7/2002 | Kleman | 342/124 |
| 6,415,660 B1 | * | 7/2002 | Sinz et al. | 73/290 R |
| 6,492,933 B1 | * | 12/2002 | McEwan | 342/28 |

FOREIGN PATENT DOCUMENTS

| | | |
|---|---|---|
| DE | 19501379 A1 | 8/1995 |
| DE | 4407369 A1 | 9/1995 |
| EP | 0955527 A1 | 11/1999 |
| EP | 1069438 A1 | 1/2001 |
| WO | WO 00/73747 A1 | 12/2000 |

* cited by examiner

*Primary Examiner*—Thomas H. Tarcza
*Assistant Examiner*—Isam Alsomiri
(74) *Attorney, Agent, or Firm*—Bacon & Thomas, PLLC; Felix J. D'Ambrosio

(57) ABSTRACT

The microwave measuring device, which preferably operates with microwave bursts, serves to produce a measured value ($X_H$) representing the level of the contents of a vessel (200). It comprises a transceiver unit (2) for generating a level-dependent intermediate-frequency signal (ZF) by means of a transmit signal ($S_2$) and a receive signal ($E_2$), and a transducer element (1) which in operation couples waves ($S_1$), particularly pulsed waves, into the vessel under control of the transmit signal ($S_2$) and converts echo waves ($E_1$) reflected from the contents (201) of the vessel into the receive signal ($E_2$). The intermediate-frequency signal (ZF) is fed to a control unit (3) of the level measuring device where it is stored in the form of a sampling sequence (AF) in a volatile data memory (33). In this manner, both amplitude information and phase information is available for the level measurement. The device is thus capable of measuring level with high accuracy, particularly accurately to a millimeter, and very fast.

5 Claims, 5 Drawing Sheets

LEVEL MEASURING DEVICE OPERATING WITH MICROWAVES

This application relies for priority on a prior filed provisional application, filed Feb. 16, 2001, and assigned Appln. No. 60/268,861.

FIELD OF THE INVENTION

This invention relates to a level measuring device operating with microwaves.

BACKGROUND OF THE INVENTION

To measure level in vessels, for instance in a liquid tank or a bulk container, particularly quasi-continuously, measuring devices operating with microwaves are frequently employed. In the measurement of level with such a level measuring device, which is based on the radar principle, electromagnetic waves, particularly in a center-frequency range of approximately 0.5 to 30 GHz, are transmitted as space waves via an antenna or as guided waves via a surface waveguide against a substance whose level is to be measured. Because of electrical impedance discontinuities within the volume comprising substance, the waves are partially reflected, particularly from the surface of the substance, and are returned via the surface waveguide or the antenna to the level measuring device as an echo signal.

In such level measuring devices, the determination of level is frequently based on the pulse radar method, in which short microwave pulses, so-called bursts, are transmitted with a pulse repetition rate in the range of a few megahertz against the substance, at least partially reflected there, and returned as an echo signal to the level measuring device in the manner described above. A transit time of the microwave pulses, measured from the time the signal is transmitted to the time the echo signal is received, serves as a measure of the level to be determined.

U.S. Pat. No. 5,614,911, EP-A 955 527, and DE-A 44 07 369, for example, each show a level measuring device operating with microwaves which uses the pulse radar method and comprises:
- a microwave transceiver unit for generating a level-dependent analog intermediate-frequency signal by means of a pulsed transmit signal and a receive signal;
- a transducer element
   which in operation couples waves into the vessel under control of the transmit signal, and
   which converts echo waves reflected from contents of the vessel into the receive signal; and
- an envelope evaluation unit with an amplitude demodulator for the intermediate-frequency signal for generating an analog envelope signal.

As described in DE-A 44 07 369, the envelope signal may serve to control a threshold-triggered counter stage in such a way that an average value of two counts of the counter stage represents the level-dependent transit time. As described in EP-A 955 527, for example, the analog enevelope signal may also be digitized and, after being periodically modulated with a square-wave window, stored temporarily in sections. From an envelope sampling sequence thus generated, both the time of transmission of the signal and the time of reception of the echo signal can be determined and the transit time can be calculated therefrom using a suitable evaluating technique, particularly a technique implemented in a microcomputer.

It turned out that in order to determine level with a high degree of accuracy, in particular accurately to a millimeter, in addition to the amplitude information of the intermediate-frequency signal, which is mapped onto the envelope signal, information about the phase of the receive signal relative to that of the transmit signal may be necessary, as described in EP-A 1 069 438 or in DE-A 44 07 369, for example. To derive such additional phase information, the level measuring device disclosed in DE-A 44 07 369 further comprises a phase evaluation unit with an analog quadrature demodulator for the intermediate-frequency signal to generate an analog first quadrature signal, representing the real part of the intermediate-frequency signal, and an analog second quadrature signal, representing the imaginary part of the intermediate-frequency signal.

A major disadvantage of that level measuring device is the discrete design of both the envelope evaluation unit and the phase evaluation unit. Because of this design, particularly because of the great share of analog devices, an increase in the pulse repetition rate of the transmit signal and/or a reduction of the measurement and evaluation cycle time, for example in order to increase measurement accuracy and/or the speed of evaluation, is only possible on a very small scale. Furthermore, to ensure sufficient accuracy of the transit time determined, each of the components used must both belong to a type class with small variances in component parameters and with high long-term stability, and be wired with high accuracy and, consequently, at high cost.

SUMMARY OF THE INVENTION

It is therefore an object of the invention to provide a level measuring device, particularly a device measuring accurately to a centimeter, which uses both amplitude information and phase information for the level measurement and permits a significant increase in the evaluating speed during the level measurement. Furthermore, the level measuring device is to be suited for large-scale integration.

To attain the object, a first variant of the invention provides a level measuring device operating with microwaves, particularly with microwave bursts, for producing a level value representative of a level in a vessel, said level measuring device comprising:
- a transceiver unit for generating a level-dependent intermediate-frequency signal by means of a transmit signal and a receive signal;
- a transducer element
  which in operation couples waves, particularly pulsed waves, into the vessel under control of the transmit signal and
  which converts echo waves reflected from contents of the vessel into the receive signal; and
- a control unit with a volatile data memory for storing, at least temporarily, a sampling sequence representing the intermediate-frequency signal.

A second variant of the invention provides a level measuring device operating with microwaves, particularly with microwave bursts, for producing a level value representative of a level in a vessel, said level measuring device comprising:
- a transceiver unit for generating a level-dependent intermediate-frequency signal by means of a transmit signal and a receive signal;
- a transducer element
  which in operation couples waves, particularly pulsed waves, into the vessel under control of the transmit signal and
  which converts echo waves reflected from contents of the vessel into the receive signal; and a control unit with a volatile data memory for storing, at least temporarily, a digital phase sequence
which represents a normalization of the intermediate-frequency signal to an amplitude variation of the intermediate-frequency signal and
which corresponds to a temporal phase variation of the intermediate frequency signal.

In a first preferred embodiment of the two variants of the invention, the level measuring device comprises a logarithmic amplifier for the intermediate-frequency signal.

In a second preferred embodiment of the invention, the level measuring device determines the level value by means of amplitude information derived from the sampling sequence.

In a third preferred embodiment of the invention, the level measuring device determines the level value by means of phase information derived from the sampling sequence.

In a fourth preferred embodiment of the first variant of the invention, the volatile data memory holds, at least temporarily, a first signal sequence, which represents a numerically performed multiplication of the sampling sequence by a digital sine-wave signal sequence, and/or a second signal sequence, which represents a numerically performed multiplication of the sampling sequence by a digital cosine-wave signal sequence.

In a fifth preferred embodiment of the first variant of the invention, the volatile data memory holds, at least temporarily, a first quadrature-signal sequence, which represents a numerically performed downconversion of at least a portion of the first signal sequence, and/or a second quadrature signal sequence, which represents a numerically performed downconversion of at least a portion of the second signal sequence.

In a sixth preferred embodiment of the first variant of the invention, the volatile data memory holds, at least temporarily, a first average-value sequence, which serves in particular to generate the first quadrature-signal sequence and represents a variation of a time average of at least a portion of the first signal sequence, and/or a second average-value sequence, which serves in particular to generate the second quadrature-signal sequence and represents a variation of a time average of at least a portion of the second signal sequence.

In a seventh preferred embodiment of the first variant of the invention, the volatile data memory holds, at least temporarily, a data record which corresponds to a phase of a data record of the sampling sequence and represents a numerical division of a data record of the first quadrature-signal sequence by an essentially equal-locus data record of the second quadrature-signal sequence.

In an eighth preferred embodiment of the first variant of the invention, the volatile data memory holds, at least temporarily, a first digital phase sequence which corresponds to a temporal phase variation of at least a portion of the intermediate-frequency signal.

In a ninth preferred embodiment of the first variant of the invention, the volatile data memory holds, at least temporarily, a digital envelope which represents a temporal amplitude variation of the intermediate-frequency signal.

In a tenth preferred embodiment of the first variant of the invention, the volatile data memory holds, at least temporarily, a data record which corresponds to a phase of a data record of the sampling sequence and represents a numerical division of said data record by an essentially equal-locus data record of the envelope.

In an eleventh preferred embodiment of the first variant of the invention, the volatile data memory holds, at least temporarily, a second digital phase sequence which corresponds to a temporal phase variation of at least a portion of the intermediate-frequency signal.

A fundamental idea of the invention is to generate digitally stored raw data, i.e., data with a maximum possible content of information about the measured volume, particularly about the level of the contents of the vessel, and with a minimum possible content of analog preprocessing, on which subsequent evaluation procedures, particularly those for determining level, are based. The invention is also predicated on the surprising recognition that despite increased memory requirements, a significant improvement in evaluating speed can be achieved at high accuracy.

One advantage of the invention is that both the conversion of the intermediate-frequency signal and the processing of the sampling sequence can be adapted in a very simple manner to changing boundary conditions, such as a change in pulse repetition rate, a drift of the center frequency of the transmit signal, or a change in evaluation cycle time.

Another advantage of the invention is that the amount of circuitry required to ensure a sufficient signal-to-noise ratio of the intermediate-frequency signal to be digitized is greatly reduced.

BRIEF DESCRIPTION OF THE DRAWINGS

The invention and further advantages will become more apparent by reference to the following description of an embodiment taken in conjunction with the accompanying drawings, in which.

DETAILED DESCRIPTION OF EXEMPLARY EMBODIMENTS

Figure 1:
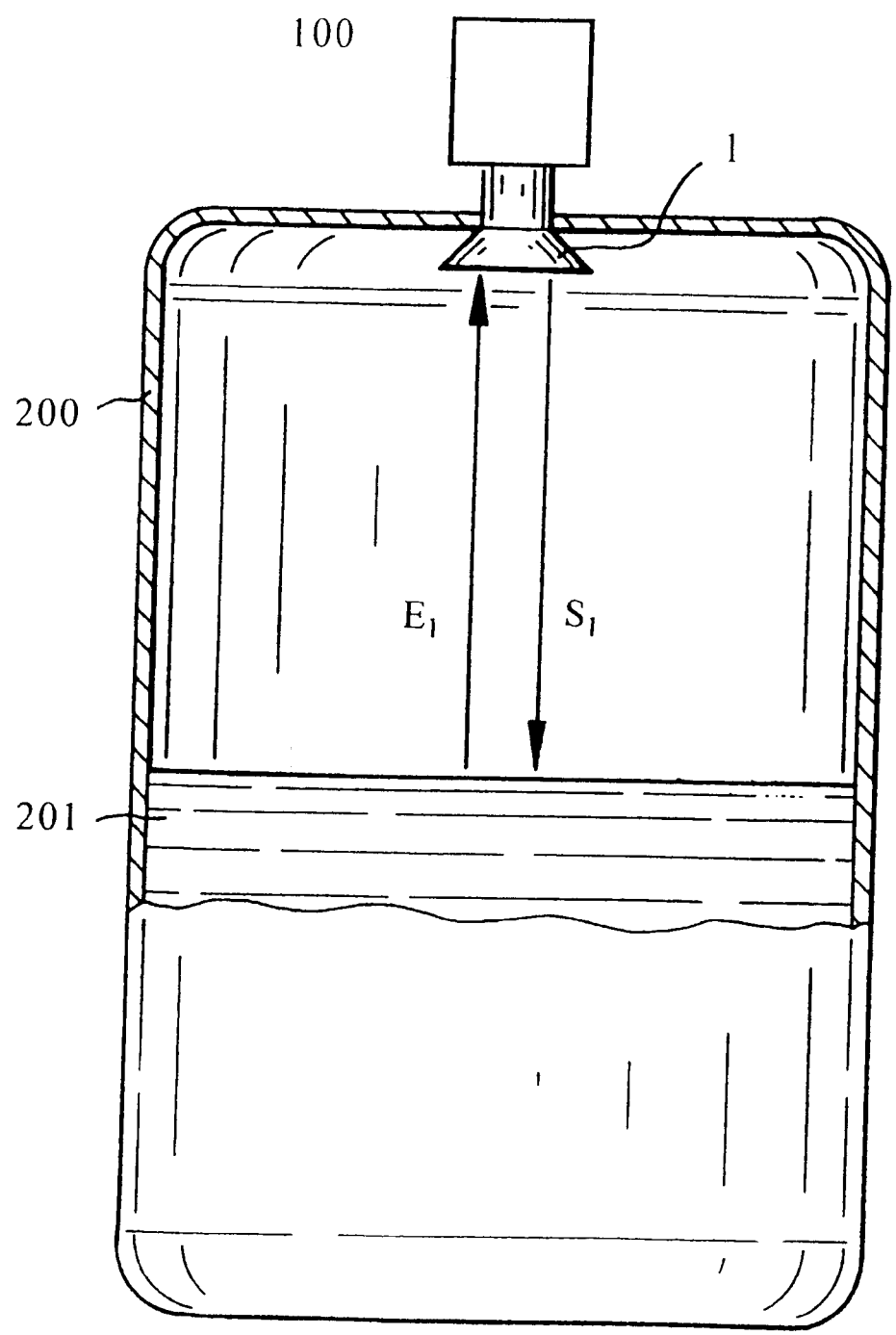
FIG. 1 shows a level measuring device mounted on a container for measuring level in the container.

While the invention is susceptible to various modifications and alternative forms, exemplary embodiments thereof have been shown by way of example in the drawings and will herein be described in detail. It should be understood, however, that there is no intent to limit the invention to the the particular forms diclosed, but on the contrary, the intention is to cover all modifications, equivalents, and alternatives falling within the spirit and scope of the invention as defined by the intended claims.

Figure 2:
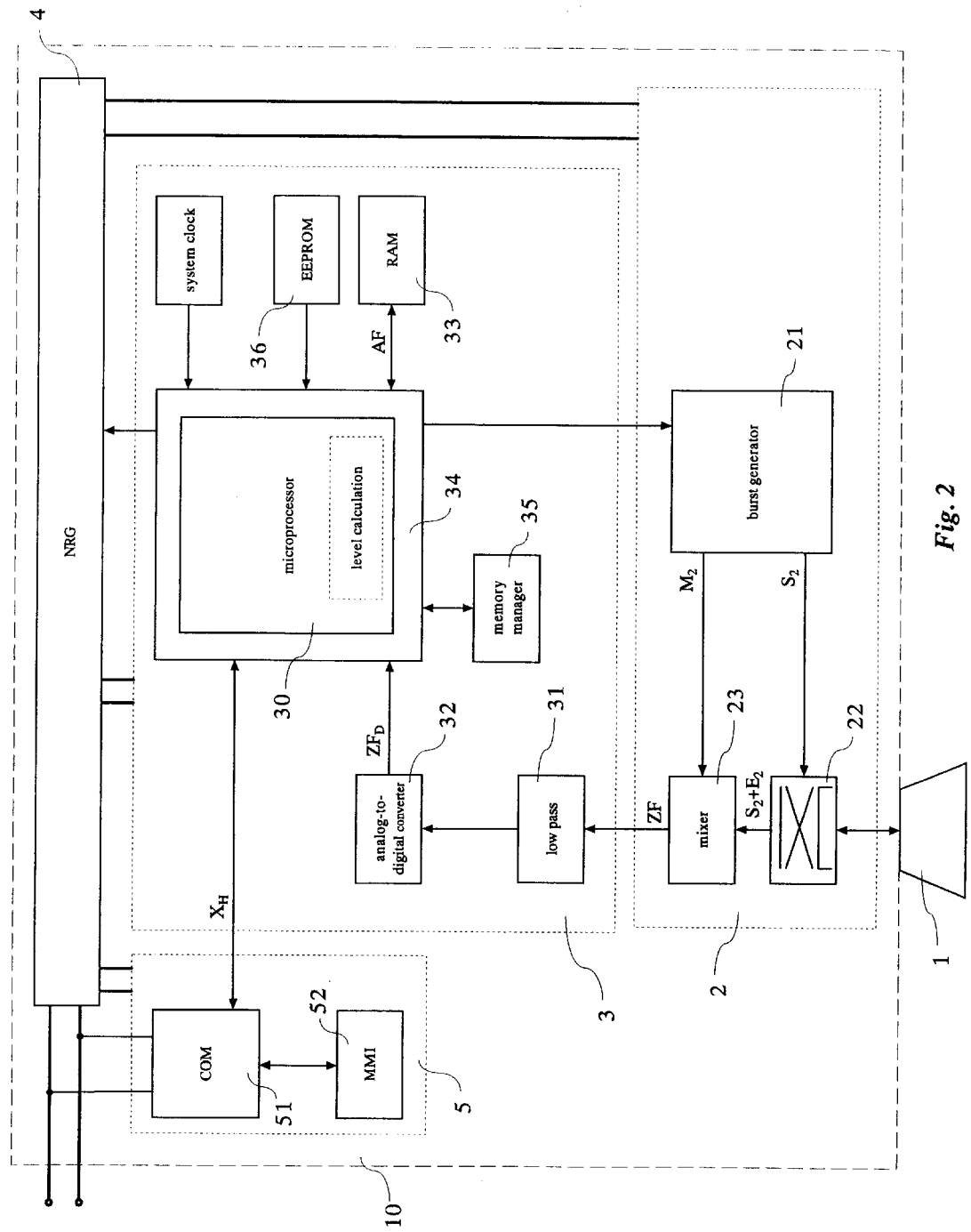
FIG. 2 is a block diagram showing functional elements of a level measuring device operating with microwaves.

Referring to FIGS. 1 and 2, there is shown an embodiment of a level measuring device operating with microwaves which is mounted on a container 200 that can be filled with a substance 201.

The level measuring device serves to determine the level of substance 201 in container 200 based on the pulse radar method and, using a suitable control unit 3, provides a measured value $X_H$, e.g., a digital value, which is representative of the instantaneous level of the substance.

To this end, the level measuring device, as shown in FIG. 1, comprises a transducer element 1 which is preferably attached to an electronics case 100 and by means of which pulsed electromagnetic waves $S_1$, modulated on and having a lower frequency than a radio-frequency carrier, are coupled into a volume comprising the substance 201 and thus transmitted as space waves against this substance. As is customary in such level measuring devices operating with microwaves, a center frequency of the transmit signal $S_2$ lies in a range of a few gigahertz, particularly in the range of 0.5 to 30 GHz.

Transducer element 1 may be, for example, a horn antenna as shown, a rod antenna, a parabolic antenna, or a planar-array antenna that radiates microwaves $S_1$. Instead of such space waves, surface waves guided via waveguides, for example, may be used for the level measurement, as mentioned at the beginning.

Because of impedance discontinuities within the volume, particularly at a surface of substance 201, the radiated waves $S_1$ are at least partially reflected and thus converted to corresponding echo waves $E_1$, which travel back toward and are received by transducer element 1.

A transceiver unit 2 coupled to transducer element 1 serves to generate and process line-conducted and coherent wave packets of predeterminable pulse shape and pulse width, so-called bursts, and to produce a level-dependent, analog intermediate-frequency signal ZF by means of the bursts. The pulse shape of an individual burst generally corresponds to that of a needle-like or half-wave-like pulse of predeterminable width; if necessary, however, other suitable pulse shapes may be used for the bursts.

Transceiver unit 2 is housed in electronics case 100 and, as shown in FIG. 2, comprises an electronic burst generator 21 for generating a first burst sequence, which serves as a transmit signal $S_2$. As is customary in such level measuring devices, the center frequency of the transmit signal $S_2$ lies in a range between approximately 0.5 and 30 GHz, and its pulse repetition rate is set at a range of a few megahertz, particularly at a range of 1 to 10 MHz; if necessary, the center frequency and/or the pulse repetition rate may also lie above those ranges.

The transmit signal $S_2$, which appears at a first signal output of burst generator 21, is transferred by means of a directional coupler 22 of transceiver unit 2 to transducer element 1, which is connected to a first signal output of directional coupler 22 and which converts the signal into the transmitted waves $S_1$. Practically at the same time, the transmit signal $S_2$ also appears at a second signal output of directional coupler 22.

As mentioned above, the echo waves $E_1$, generated in the measured volume in the manner described above, are received by transducer element 1 of the level measuring device and converted back into a second burst sequence, which serves as a receive signal $E_2$ and which also appears at the second signal output of directional coupler 22. Accordingly, the sum of the transmit signal $S_2$ and the receive signal $E_2$, i.e., $S_2+E_2$ is provided at the second output of directional coupler 22.

Particularly if, as is usually the case with such level measuring devices, the center frequency and/or the pulse repetition rate of transmit signal $S_2$ is chosen to be so high that direct evaluation of the signal sum appearing at the second signal output of directional coupler 22, and particularly a direct measurement of transit time, would be virtually impossible or only be possible with a large amount of circuitry, transceiver unit 2 preferably includes a mixer 23 which serves to stretch the signal sum modulated on a radio-frequency carrier, such that the center frequency and the pulse repetition rate are shifted to a lower frequency range of a few kilohertz.

To stretch the signal sum $S_2+E_2$, the latter is fed from the second signal output of directional coupler 22 to a first signal input of mixer 23. At the same time, a third burst sequence, serving as a local-oscillator signal $M_2$, is applied to a second signal input of mixer 23. The pulse repetition rate of the local-oscillator signal $M_2$ is chosen to be slightly lower than that of the transmit signal $S_2$, but the local-oscillator signal $M_2$ has practically the same center frequency as the transmit signal $S_2$. The signal $M_2$ is also generated by burst generator 21 and, as shown in FIG. 2, is provided at a second signal output of the burst generator.

By means of mixer 23, the signal sum is amplitude-modulated with the local-oscillator signal $M_2$ and then low-pass filtered. The signal sum $S_2+E_2$ is thus mapped onto a signal serving as the intermediate-frequency signal ZF, which has been stretched by a stretching factor with respect to the signal sum and has a correspondingly lower frequency. The stretching factor is equal to the quotient of the pulse repetition rate of transmit signal $S_2$ and the difference between the pulse repetition rate of transmit signal $S_2$ and the pulse repetition rate of the local-oscillator signal $M_2$. In such level measuring devices, a center frequency of the intermediate-frequency signal ZF generated in this way will generally lie in the range of 50 to 200 kHz; if necessary, the frequency range may be chosen to be higher or lower.

Before being output from transceiver unit 2, the intermediate-frequency signal ZF, if necessary, may, of course, be preamplified in a suitable manner, and thus be adapted in shape for processing in subsequent circuits.

To control transceiver unit 2 and derive the measured level value $X_H$ from the intermediate-frequency signal ZF, the level measuring device, as mentioned above, comprises a control unit 3, which may also be housed in electronics case 100.

According to the invention, control unit 3 serves in particular to digitize the intermediate-frequency signal ZF and store it in sections such that for the determination of the level value $X_H$, both amplitude information and phase information about the intermediate-frequency signal ZF is available in digital form.

To this end, the intermediate-frequency signal ZF, as shown schematically in FIG. 2, is fed to control unit 3 preferably through a low-pass filter 31, e.g., an RC passive or active filter, of predeterminable order and adjustable cutoff frequency. Low-pass filter 31 serves to bandlimit the intermediate-frequency signal ZF in order to avoid aliases, and thus to preprocess the signal for digitization in a suitable manner. To accomplish this, according to the well-known Nyquist sampling theorem, the cutoff frequency is chosen to be less than 0.5 times, but not less than 0.2 times, a sampling frequency at which the passed component of the intermediate-frequency signal is sampled. If the intermediate-frequency signal ZF has already been band-limited in the necessary manner, low-pass filter 31 can be dispensed with.

The output of low-pass filter 31 is coupled to a signal input of an analog-to-digital (A/D) converter 32 of control unit 3, which serves to convert the intermediate-frequency signal ZF, applied through low-pass filter 31, to a corresponding digital intermediate-frequency signal $ZF_D$. For the A/D converter 32, any of the conventional A/D converters, e.g., serial or parallel converters, which can be clocked at the above-mentioned sampling frequency may be used. A suitable A/D converter type is, for instance, the sampling A/D converter LTC 1415 of Linear Technology Corp. with a resolution of 12 bits and a permissible sampling frequency less than or equal to 1.25 MHz.

If A/D converter 32, e.g., the aforementioned LTC 1415, is designed to convert exclusively positive signal values, a reference voltage of A/D converter 32 must be chosen so that a minimum signal value to be expected will set at least one bit, particularly the most significant bit (MSB), of the intermediate-frequency signal $ZF_D$ at the input of the converter. In other words, a DC component must be added to the signal appearing at the output of low-pass filter 31 such that the signal will act on A/D converter 32 as a DC signal of variable amplitude.

Figure 3:
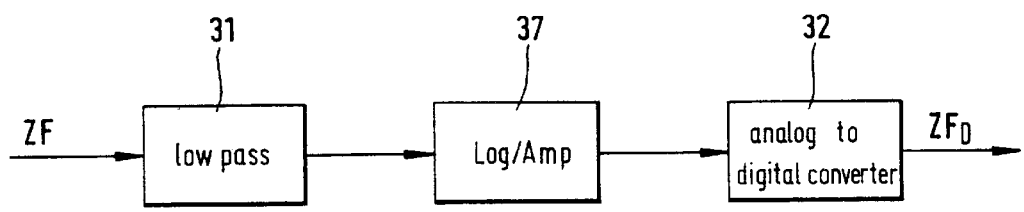
FIG. 3 is a block diagram showing functional elements of a development of the level measuring device of FIG. 2.

According to a development of the invention, as shown in FIG. 3, low-pass filter 31 is coupled to A/D converter 32 through a logarithmic amplifier 37. Logarithmic amplifier 37, e.g., type AD637 or AD8307 of Analog Devices, serves to condense the amplitude information of intermediate-frequency signal ZF while retaining the phase information, such that instead of the above-mentioned 12-bit A/D converter, an 8-bit A/D converter, for example, can now be used to achieve essentially equally high accuracy. If necessary, logarithmic amplifier 37 may also be connected directly ahead of low-pass filter 31, for example.

The digital intermediate-frequency signal $ZF_D$ provided at the output of A/D converter 32 is loaded in sections, for instance via an internal data bus, into a volatile data memory 33 of control unit 3, where it is available, particularly to a digital level computer 34 of control unit 3, as a finite sampling sequence AF in the form of an ensemble of digitally stored data records representing the current intermediate-frequency signal ZF. The data memory 33 may be a static or dynamic random access memory, for example.

To derive the level value $X_H$ from the sampling sequence AF, level computer 34 has at least temporary access, particularly read access, for example via an internal data bus, to data memory 33 and the data records stored therein. Level computer 34 is advantageously implemented with a microprocessor 30 and calculator programs executed therein, as shown schematically in FIG. 2.

In a preferred embodiment of the invention, control unit 3 further comprises a memory manager 35, which is designed as a separate subcircuit and which, communicating with microprocessor 30, for example via an internal data bus, serves to manage data memory 33 and particularly to control the sampling of the digital intermediate-frequency signal $ZF_D$ and the generation of the sampling sequence AF, thus relieving the burden of microprocessor 30. To achieve a sufficient computing speed, memory manager 35 is preferably clocked many times faster, particularly 8, 10, or 12 times faster, than A/D converter 32.

Memory manager 35 is preferably implemented in a programmable function memory, such as a programmable array logic (PAL) or a field programmable gate array (FPGA). If necessary, memory manager 35 may also be implemented with microprocessor 30 or a further microprocessor (not shown) and with suitable calculator programs executed therein.

Memory manager 35 may also be used, for example, to implement the formation of an average or median over several sampling sequences, as is customary in such level measuring devices.

The determination of the level value $X_H$ by the pulse radar technique, as mentioned, is based on the evaluation of a level-dependent transit time of the echo waves $E_1$, which can now be determined with a high degree of accuracy by means of the amplitude and phase information held in data memory 33 in the form of the sampling sequence AF.

The amplitude information of the intermediate-frequency signal ZF may be derived, for example, by digital rectification of the sampling sequence AF, i.e., by simply forming the absolute value of all data tuples of the sampling sequence AF, in level computer 34, followed by a maximum detection in which the selected data tuples of local maxima are used to model an amplitude variation of the intermediate-frequency signal ZF in the form of a digital envelope ENV. To such a digitally created envelope, the evaluating methods for transit-time determination that are familiar to the person skilled in the art can be readily applied, cf. in particular EP-A 668 488, EP-A 882 957, EP-A 1 069 438, WO-A 94/14037, WO-A 95/08780. If necessary, however, other digital amplitude demodulation methods familiar to the person skilled in the art may be used.

Figure 4:
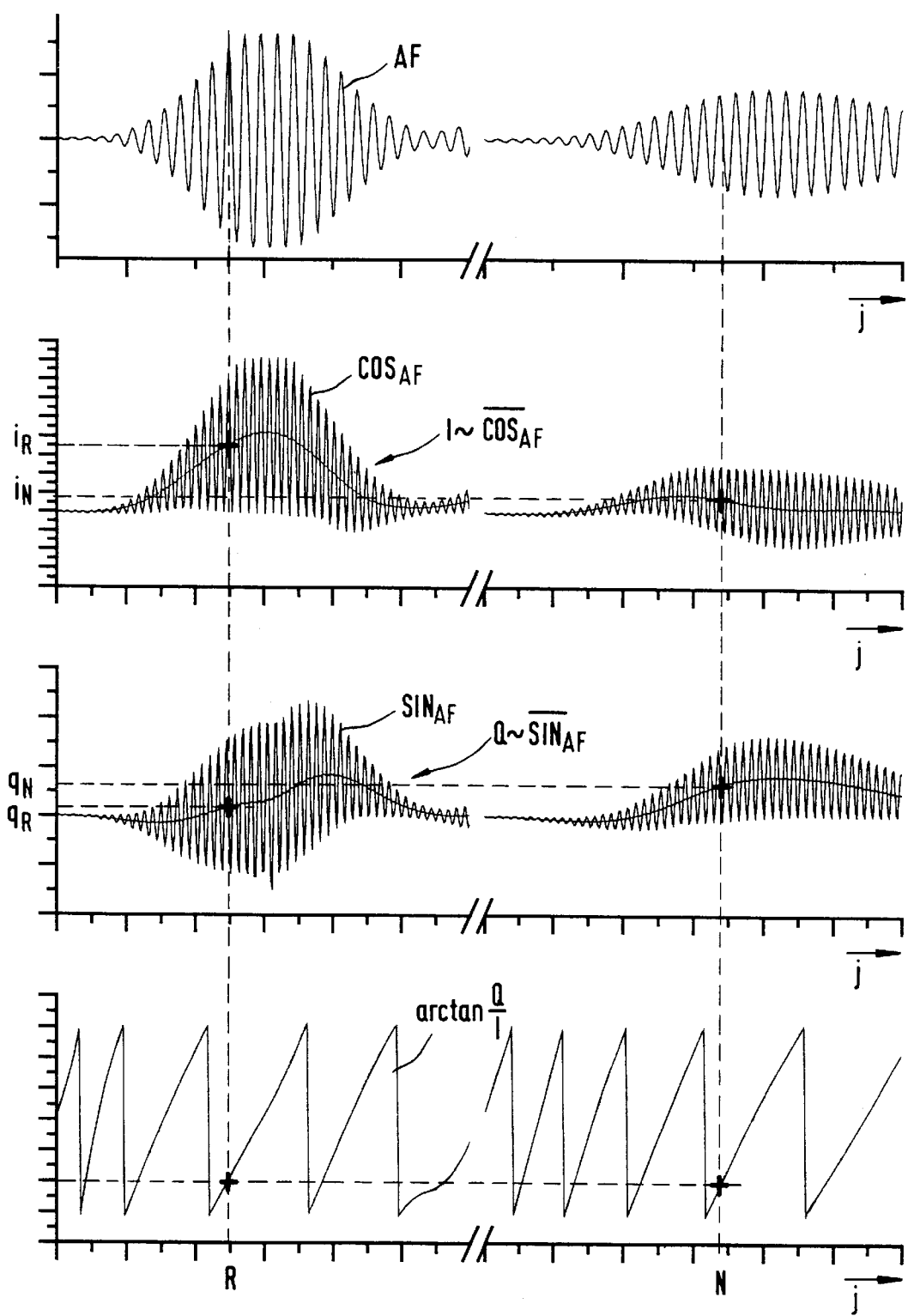
FIG. 4 shows schematically and in greatly simplified form a digitally stored sampling sequence which is generated by means of the level measuring device of FIG. 2 and represents a level-dependent intermediate-frequency signal, and signal sequences derived therefrom according to a preferred embodiment which are used for the level measurement.

Besides the envelope ENV, the two aforementioned quadrature signals representing the real and imaginary parts of the intermediate-frequency signal ZF in digital form can be derived from the sampling sequence AF to obtain the phase information. To do this, the sampling sequence AF may, for instance, be multiplied at least in sections, particularly in the region of a previously digitally detected useful echo, by a digital sine-wave signal sequence and by a digital cosine-wave signal sequence of predeterminable frequency, particularly of a frequency approximately equal to the center frequency of the intermediate-frequency signal ZF, by means of level computer 34 to generate a first digital signal sequence $SIN_{AF}$ and a second digital signal sequence $COS_{AF}$, see FIG. 4, which are also stored in data memory 33, for example.

At this point it should be noted that using the well-known relationship $$ENV = \sqrt{Q^2 + I^2}$$

the quadrature-signal sequences Q, I can also be used to generate the above-mentioned digital envelope ENV, i.e., to obtain the amplitude information.

To generate the digital quadrature-signal sequences Q, I, these signal sequences $SIN_{AF}$, $COS_{AF}$ may, for instance, be digitally low-pass-filtered and then be numerically converted, according to the well-known trigometric relationships, into a corresponding amplitude or phase value from which the level value $X_H$ can be calculated practically direct, cf. DE-A 44 07 369, in which this technique, which is also referred to as quadrature downconversion, is described.

In a preferred embodiment of the invention, which serves to determine the level value $X_H$ with high accuracy, particularly accurately to a millimeter, an approximate determination of the transit time, particularly a determination accurate within a range up to one half or one quarter wavelength of the digital intermediate-frequency signal $ZF_D$, is performed on the basis of a first data record $env_R$, which serves as a reference point, and a second data record $env_N$, which serves as a level echo or useful echo.

How the two data records $env_R$ and $env_N$, which partially represent the amplitude information inherent in the sampling sequence AF in the region of the reference point and the useful echo, respectively, has to be selected from such a digitized envelope is familiar to those skilled in the art of level measurement based on the pulse-radar principle and is described in detail at least in DE-A 44 07 369 or in EP-A 1 069 438, so that a more detailed description of this step can be dispensed with. If necessary, the data records $env_R$, $env_N$ can also be determined from the sampling sequence AF direct.

To finally determine the transit time representing the level in the container, that data tuple $q_N/i_N$ of the useful echo which most closely corresponds to a data tuple $q_R/i_R$ formed at the reference point is determined data record by data record, preferably by means of a respective data tuple $q_j/i_j$ (j= index of the currently selected quadrature data records) formed from individual data records of the two quadrature-signal sequences Q, I, which digitally represent a downconversion of the sampling sequence AF, beginning with a start data tuple lying in the expected or already determined index range of the second data record $env_N$, for example. The two data tuples thus found, $q_R/i_R$, $q_N/i_N$, can then be readily rescaled into phase values corresponding practically directly to the transit time, for example by repeated use of a numerically implemented arc-tangent function, i.e., arctan $(q_R/i_R)$, $arctan(q_N/i_N)$.

In another preferred embodiment of the invention, the level value $X_H$ is determined by first forming all data tuples $q_j/i_j$ or at least a part of the data tuples relevant to the level measurement, which are generable by means of the quadrature-signal sequences Q, I, and storing them in data memory 33 in the form of a phase sequence Q/I corresponding to the temporal phase variation of the intermediate-frequency signal. Then, the data records $env_R$ and $env_N$, taking into account the predetermined reference point and the useful echo, respectively, are so adapted to one another that their phase values, derived from the respective associated data tuples $q_R/i_R$, $q_N/i_N$, correspond in these ranges as exactly as possible, cf. FIG. 4.

To improve the above method of determining the quadrature-signal sequences Q, I, in a further preferred embodiment of the invention, the digital low-pass filter serving to evaluate the signal sequences $SIN_{AF}$, $COS_{AF}$ and implemented with level computer 34 is advantageously replaced as follows. The two digital signal sequences $SIN_{AF}$, $COS_{AF}$ are first stored, e.g., in data memory 33. Instead of the conventionally performed subsequent low-pass filtering, which in the present case of digital signal processing would involve a considerable amount of computational complexity and require a large amount of storage space, the quadrature-signal sequences Q, I are determined on the basis of the variation of a time average of the signal sequence $SIN_{AF}$ and a time average of the signal sequence $COS_{AF}$, which time averages are determined period by period. Advantageously, the time averages are determined only for those regions around the reference point and the useful echo which are of interest, i.e., in the regions of the first and/or second data records $env_R$, $env_N$.

To the inventors' surprise it turned out that the variation of the time average of the two signal sequences $SIN_{AF}$, $COS_{AF}$, which can be very quickly and easily determined numerically anyhow, can be determined even much more easily and particularly with less computation by using only selected data records of the signal sequences $SIN_{AF}$, $COS_{AF}$, preferably local maxima and minima corresponding to the aforementioned regions of the first and/or second data records $env_R$, $env_N$, to calculate the temporal variation of the average values.

Figure 5:
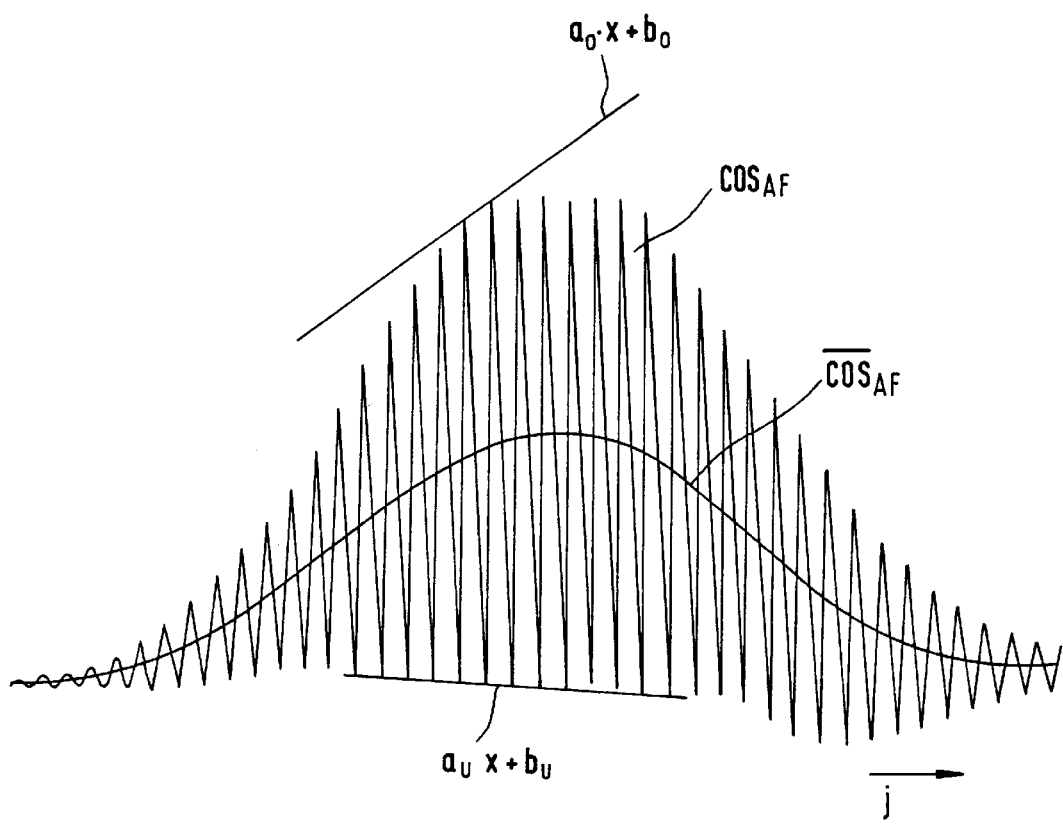
FIG. 5 shows schematically a preferred embodiment of a method capable of being implemented in the level measuring device of FIG. 2 for processing the digitally stored sample sequence of FIG. 4.

To generate such an average-value sequence $\overline{SIN_{AF}}$, $\overline{COS_{AF}}$, which represents the variation of the time average of at least a portion of the signal sequences $SIN_{AF}$, $COS_{AF}$ and is advantageously also stored digitally, a, particularly linear, regression analysis is carried out using a first data set, representing at least two selected or calculated maxima of the signal sequence $SIN_{AF}$, $COS_{AF}$, and a second data set, likewise representing at least two selected or calculated maxima of the signal sequence $SIN_{AF}$, $COS_{AF}$, cf. FIG. 5. From the two sets of parameters thus obtained for the rules for forming the functions determined by regression, which then describe the envelopes of the signal sequences $SIN_{AF}$, $COS_{AF}$, a set of parameters can then be easily derived for the rule functionally describing the temporal variation of the average value, e.g., $a_o \cdot x + b_o$, $a_u \cdot x + b_u$ (FIG. 5), by determining the average of the respective matching two parameters of the two sets of parameters representing the envelopes of the signal sequences $SIN_{AF}$, $COS_{AF}$, i.e., $0.5 \cdot (a_o + a_u)$, $0.5 \cdot (b_o + b_u)$, for example.

This aforementioned method is based particularly on the surprising recognition that even with a linear regression, i.e., although the determination of the average value is greatly simplified, the measurement error that occurs in comparison with the actual time averages of the two signal sequences $SIN_{AF}$, $COS_{AF}$ in the regions of the first and/or second data records $env_R$, $env_N$ is practically negligibly small.

Comparative examinations of the method implementing the digital low-pass filtering and the method implementing the averaging have shown that with the latter method, a reduction of the computational complexity by a factor of 10 to 50 can be readily achieved with comparable measurement accuracy. At this point it should be noted that the highly accurate determination of local maxima or minima of the quadrature-signal sequences Q, I can also be made using the method of determining a local extremum of a digital data sequence described in applicant's U.S. patent application Ser. No. 60/264,028, which was not published prior to the filing date of the present application.

Another development of the invention, which also serves in particular to reduce the computation time and the amount of storage space needed to derive the transit time from the sampling sequence AF, does without the generation of the quadrature-signal sequences Q, I and derives the phase information required for the high-precision level measurement practically directly from the sampling sequence AF. This is done by selecting the data record $env_R$ from the envelope ENV or determining it from the sampling sequence AF and by determining in the sampling sequence AF precisely that data record $af_R$ whose locus or transit-time position, represented by the associated data-record index, for example, most closely corresponds to the locus or transit-time position of the associated data record $env_R$, as shown schematically in FIG. 6. By a simple division of the numerical values of the two data records $af_R$, $env_R$, a data tuple $af_R/env_R$ corresponding to the phase of the data record $af_R$, particularly a tuple proportional to the sine of this phase, can be obtained in a very simple and rapid manner.

Figure 6:
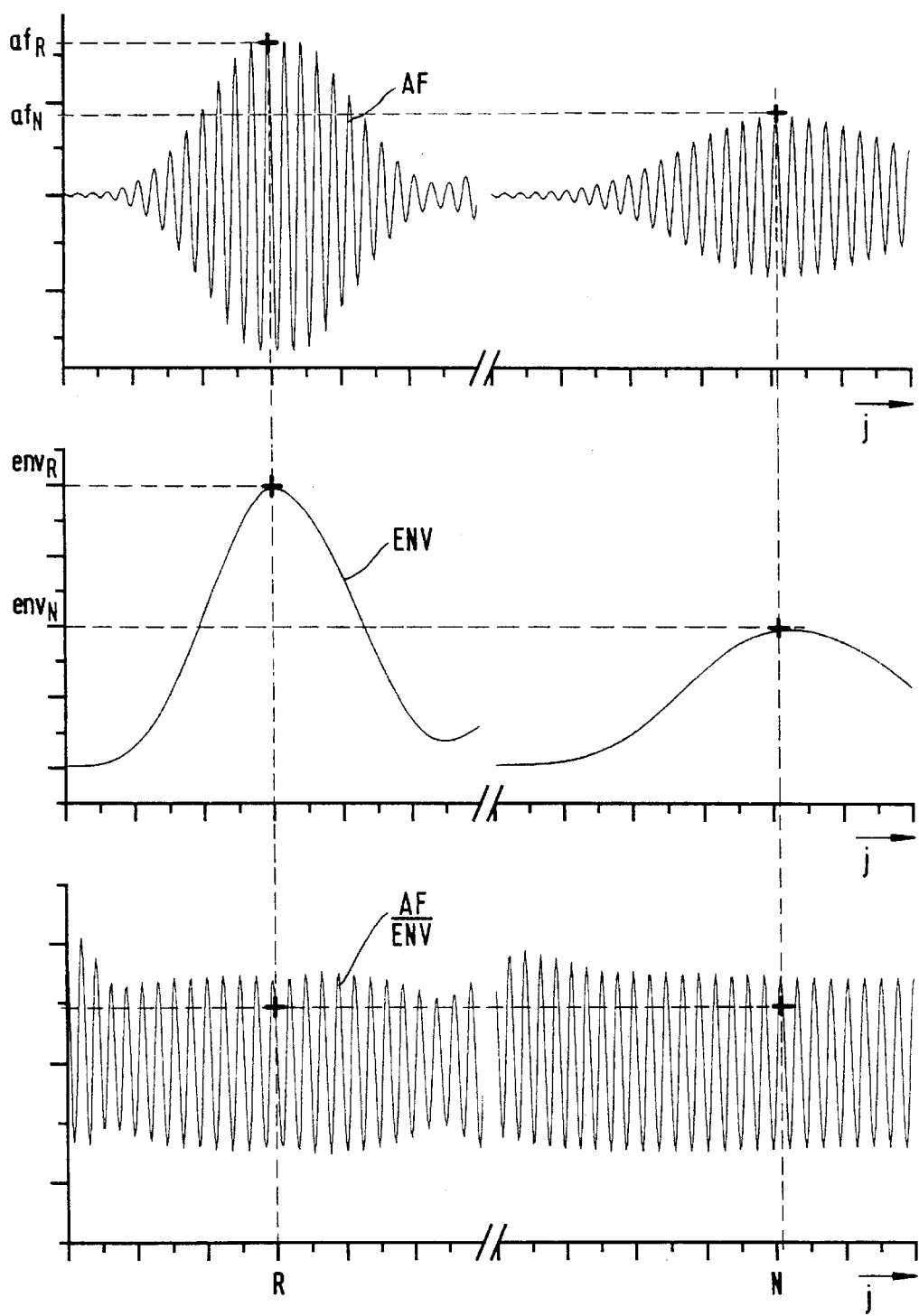
FIG. 6 shows schematically and in greatly simplified form the digitally stored sampling sequence of FIG. 4 as well as other digital signal sequences derived therefrom according to a further preferred embodiment.

Preferably, however, a record-by-record division is performed over the entire envelope ENV and the entire sampling sequence AF, as also shown in FIG. 6, thus normalizing the intermediate-frequency signal ZF to an amplitude variation represented by the envelope ENV. A resulting digital phase sequence AF/ENV is stored in data memory 33 to thereby digitally map a phase variation of at least a portion of the intermediate-frequency signal ZF.

To determine the transit time representing the level in the container, a record-by-record comparison of respective data tuples $af_j/env_j$ (j= index of the currently selected quadrature data records) formed from a data record $af_j$ of the sampling sequence AF and an envelope data record $env_j$, again preferably beginning with a start data record lying, for example, in the expected or predetermined portion of the data record $env_N$ and in an associated, i.e., practically cophasal data record $af_N$ of the sampling sequence AF, can be performed to determine that data tuple $af_N/env_N$ of the useful echo which most closely corresponds to the data tuple $af_R/env_R$ of the reference point. By using a numerically implemented arc-sine function, the two data tuples relevant to the transit-time measurement, $af_R/env_R$, $af_N/env_N$, can be easily rescaled into data proportional to the phase.

By the above-described numerical division of individual data records of the sampling sequence by the respective equal-locus and, thus, cophasal data records of the envelope ENV, the phase information contained in the sampling sequence AF in combination with the amplitude information is separated from the amplitude information and thus extracted from the sampling sequence AF.

Another possibility of deriving the phase information using the data tuple $af_R/env_R$ is to determine a data tuple $af_N/env_N$ for the useful echo from the data record $env_N$ and a corresponding equal-locus data record $af_N$ of the sampling sequence AF, to rescale the two data tuples into data proportional to the phase in the above-described manner, and to form the difference of the two values so obtained. By multiplying this phase difference by an instantaneous wavelength of the intermediate frequency signal ZF, which can be assumed to be available in digital form in level measuring devices of the kind described herein, a corresponding correction value can be determined for the phase value derived directly from the data tuple $af_N/env_N$.

If necessary, however, methods other than those proposed herein may be used to digitally derive amplitude and/or phase information from the sampling sequence AF.

The evaluating methods necessary to determine the level value $X_H$ from the sampling sequence AF, e.g., by means of transit times derived from the envelope ENV and the phase sequence AF/ENV or from the quadrature-signal sequences Q, I, may be implemented in the manner familiar to the person skilled in the art, for example as a calculator program that is executed in microprocessor 30. The necessary program codes can be readily implemented in a rewritable memory 36 of control unit 3, particularly in a permanent memory, such as an EPROM, a flash EEPROM, or an EEPROM, to which microprocessor 30 has read access.

In a further preferred embodiment, microprocessor 30 is implemented with a digital signal processor, such as the type ADSP21065 of Analog Devices. If necessary, control unit 3 may also contain a signal processor in addition to microprocessor 30, for example.

The level measuring device may be connected to a field bus (not shown), for example, and thus be linked to a remote control room and to an external power supply which feeds the level measuring device via an internal supply unit 4. To send measuring device data, particularly the measured level value $X_H$, to the field bus, the level measuring device further comprises a communications unit 5 with suitable data interfaces 51. Furthermore, communications unit 5 may include a display and control unit 52, particularly for visualizing measuring device data and/or for permitting adjustment of the level measuring device in situ.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A level measuring device operating with microwave bursts, for producing a level value representative of a level in a vessel, said level measuring device comprising:
    a transceiver unit for generating a level-dependent intermediate-frequency signal by means of a transmit signal and a receive signal;
    a transducer element which in operation couples transmitted waves, particularly pulsed waves, into the vessel under control of the transmit signal and which converts echo waves reflected from the contents of the vessel into the receive signal; and
    a control unit with a volatile data memory for storing, at least temporarily, a finite sampling sequence currently representing the intermediate-frequency signal, wherein:
        the volatile data memory holds, at least temporarily, a digital envelope which represents a temporal amplitude variation of the intermediate-frequency signal; and
        the volatile data memory holds, at least temporarily, a data record which corresponds to a phase of a data record of the sampling sequence and represents a result of a numerical division of said data record by an essentially equal-locus data record of the envelope.

2. A level measuring device operating with microwave bursts, for producing a level value representative of a level in a vessel, said level measuring device comprising:
    a transceiver unit for generating a level-dependent intermediate-frequency signal by means of a transmit signal and a receive signal;
    a transducer element which in operation couples transmitted waves, particularly pulsed waves, into the vessel under control of the transmit signal and which converts echo waves reflected from the contents of the vessel into the receive signal; and
    a control unit with a volatile data memory for storing, at least temporarily, a finite sampling sequence currently representing the intermediate-frequency signal, wherein:
        the volatile data memory holds, at least temporarily, a first quadrature-signal sequence, which represents a numerically performed downconversion of at least a portion of the first signal sequence; and
        the volatile data memory holds, at least temporarily, a data record which corresponds to a phase of a data record of the sampling sequence and represents a numerical division of a data record of the first quadrature-signal sequence by an essentially equal-locus data record of the second quadrature-signal sequence.

3. A level measuring device operating with microwaves for producing a level value representative of a level in a vessel, said level measuring device comprising:
    a transceiver unit for generating a level-dependent intermediate-frequency signal by means of a transmit signal and a receive signal;
    a transducer element coupling pulsed microwaves into the vessel under control of the transmit signal, and converting echo waves reflected from the contents of the vessel into the receive signal; and
    a control unit with a volatile data memory for storing, at least temporarily, a finite sampling sequence currently representing the intermediate-frequency signal, wherein:

the volatile data memory holds, at least temporarily, a digital envelope representing a temporal amplitude variation of the intermediate-frequency signal; and the volatile data memory holds, at least temporarily, a data record which corresponds to a phase of a data record of the sampling sequence and represents a result of a numerical division of said data record by an essentially equal-locus data record of the digital envelope.

4. A level measuring device operating with microwaves for producing a level value representative of a level in a vessel, said level measuring device comprising:

a transceiver unit for generating a level-dependent intermediate-frequency signal by means of a transmit signal and a receive signal;

a transducer element coupling pulsed microwaves into the vessel under control of the transmit signal, and converting echo waves reflected from the contents of the vessel into the receive signal; and a control unit with a volatile data memory for storing, at least temporarily, a finite sampling sequence currently representing the intermediate-frequency signal, wherein:

the volatile data memory holds, at least temporarily, a first signal sequence representing a numerically performed multiplication of the sampling sequence by a digital sine-wave signal sequence;

the volatile data memory holds, at least temporarily, a second signal sequence representing a numerically performed multiplication of the sampling sequence by a digital cosine-wave signal sequence;

the volatile data memory holds, at least temporarily, a second quadrature-signal sequence, which represents a numerically performed downconversion of at least a portion of the second signal sequence; and the volatile data memory holds, at least temporarily, a data record which corresponds to a phase of a data record of the sampling sequence and represents a numerical division of a data record of the first quadrature-signal sequence by an essentially equal-locus data record of the second quadrature-signal sequence.

5. A level measuring device operating with microwaves for producing a level value representative in a vessel, said level measuring device comprising:

a transceiver unit for generating a level-dependent intermediate-frequency signal by means of a transmit signal and a receive signal;

a transducer element coupling pulsed microwaves into the vessel under control of the transmit signal, and converting echo waves reflected from the contents of the vessel into the receive signal; and a control unit with a volatile data memory for storing, at least temporarily, a finite sampling sequence currently representing the intermediate-frequency signal, wherein:

the volatile data memory holds, at least temporarily, first signal sequence representing a numerically performed multiplication of the sampling sequence by a digital sine-wave signal sequence;

the volatile data memory holds, at least temporarily, a first quadrature-signal sequence, which represents a numerically performed downconversion of at least a portion of the first signal sequence; and the volatile data memory holds, at least temporarily, a first average-value sequence, which serves in particular to generate the first quadrature-signal sequence and which represents a variation of a time average of at least a portion of the first signal sequence.

* * * * *